(No Model.) 2 Sheets—Sheet 1.

J. V. PLYLER.
PLANTER.

No. 502,993. Patented Aug. 8, 1893.

Witnesses
J. M. Fowler Jr.
Roland A. Fitzgerald

Inventor
J. V. Plyler
By Lehmann Pattison & Nesbit,
Attorneys (No Model.)　　　　　　　　　　　　　　　　2 Sheets—Sheet 2.
J. V. PLYLER.
PLANTER.
No. 502,993.　　　　　　　　　Patented Aug. 8, 1893.
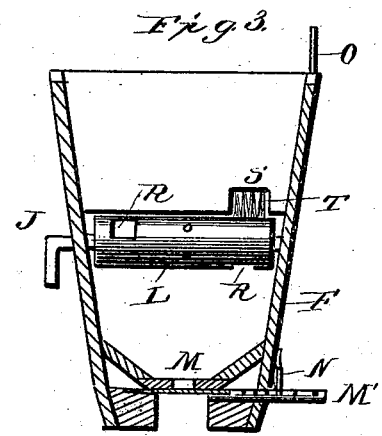
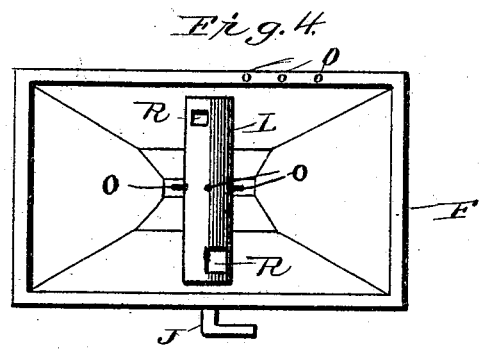
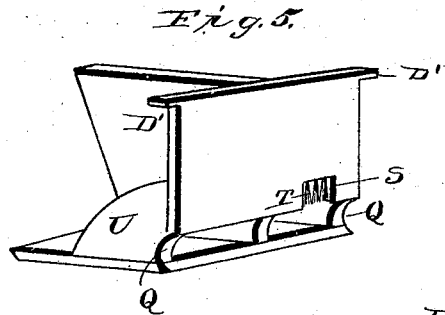
Witnesses　　　　　　　　　　　　　　　Inventor

UNITED STATES PATENT OFFICE.

JAMES VALENTINE PLYLER, OF KOSCIUSKO, MISSISSIPPI.

PLANTER.

SPECIFICATION forming part of Letters Patent No. 502,993, dated August 8, 1893.

Application filed February 17, 1893. Serial No. 462,746. (No model.)

*To all whom it may concern:*

Be it known that I, JAMES VALENTINE PLYLER, of Kosciusko, in the county of Attala and State of Mississippi, have invented certain new and useful Improvements in Planters; and I do hereby declare the following to be a full, clear, and exact description of the invention, such as will enable others skilled in the art to which it pertains to make and use it, reference being had to the accompanying drawings, which form part of this specification.

My invention relates to an improvement in planters; and it consists in the novel combination and arrangement of parts which will be fully described hereinafter and especially referred to in the claim.

The object of my invention is to provide a machine which is adapted to plant two kinds of seed at the same time together with the requisite amount of fertilizer, or which may be utilized as a cotton planter by the removal of the compartment hopper from the main hopper.

Figure 1:
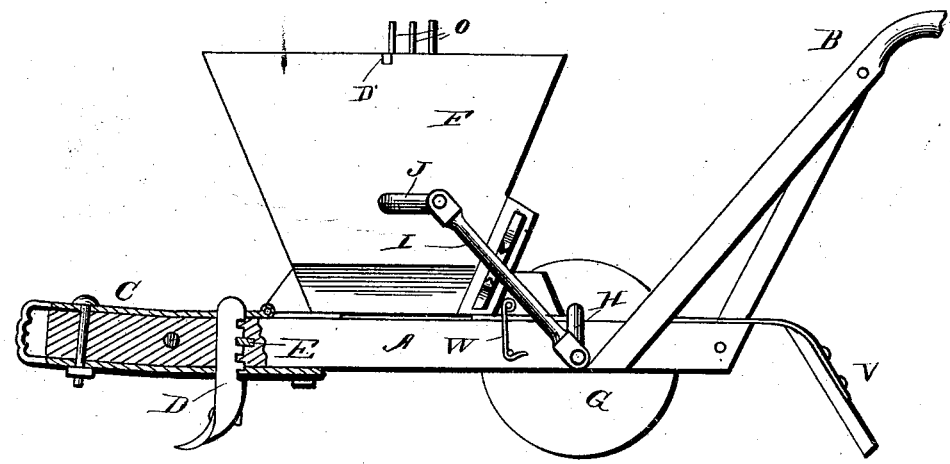
Figure 2:
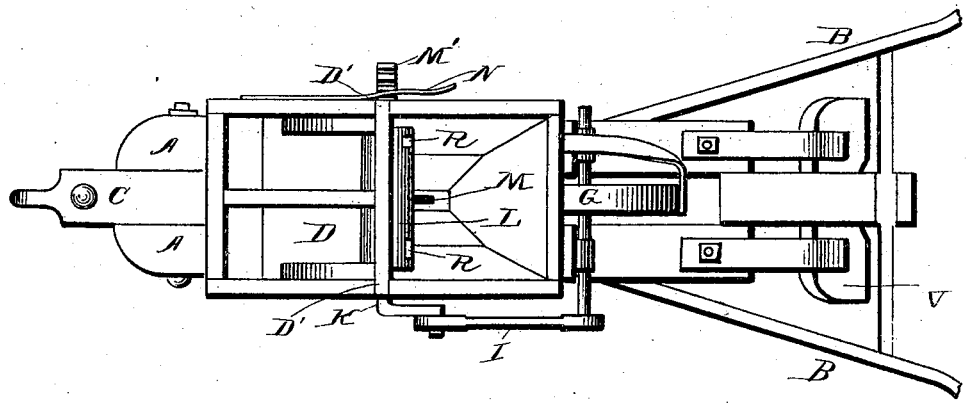

Figure 1 is a side elevation of my improved machine shown partly in section. Fig. 2 is a plan view of the same. Fig. 3 is a vertical cross sectional view of the hopper. Fig. 4 is a plan view of the same with the partition portion removed therefrom. Fig. 5 is a detached perspective view of the removable hopper partition.

A, designates parallel bars forming the main frame of the machine and extending from the rear end thereof are the handles B, and from their forward ends the clevis C. A tooth D, depends through this tongue which is notched on one side as shown and extending transversely through the bars A, is the pin E which engages the notch of the tooth which is in its path and thus holds the latter in the desired vertical adjustment.

F, is the main hopper hinged at its forward end to the frame as shown. Journaled in the rear end of the hopper frame is the drive wheel G, which depends between the bars A. One end of the axial shaft of this wheel is formed into a crank H which is connected by rod I, to crank J, of the shaft K, which extends transversely through the hopper and which shaft carries the roller L. A movable slide M, beneath the discharge of the hopper has extending therefrom the notched arm M', which projects laterally from the hopper and which is engaged by the spring N for the purpose of holding the slide in proper adjustment.

Now for planting cotton removable teeth O, are placed in the roller L and these create sufficient agitation to work the seed through the discharge.

For planting corn, peas or other small seed, as well as depositing fertilizer the pins O, are removed from the roller L, and placed on the hopper side as shown in Figs. 1 and 4. A removable partition portion P, is then placed in the forward end of the main hopper, the same having projecting ears P', which engage notches in the main hopper sides for holding it firmly in place. The lower inner corner of this removable portion is cut away as shown at Q so as to fit over roller L. The partition portion is preferably formed into two compartments and the seed or fertilizer as the case may be is carried therefrom by dropping into depressions R, formed in the periphery of the roller. The depressions in one end of the roller for carrying corn to the main hopper are preferably smaller than those in the opposite end which feed the contents of the other compartment. An upward recess S, is formed in the removable partition from which depend the brushes T which prevent more than the desired amount of corn or other seed from passing out the compartment. The other compartment of this removable partition portion or the one designated by letter U is designed mainly for fertilizer, the same being readily worked therefrom by the recessed roller while feeding seed from the other compartment. Thus it will be seen that both seed and fertilizer are dropped at the same time in a very effectual manner. A furrow closer V, is removably secured to the rear of the frame. If the planter is operating upon very rough ground this furrow closer may be removed as in such case it would be of little or no use. Hooks W, hold the hinged hopper rigid with the main frame when the planter is being moved from one place to another, while when in operation these hooks are released so as to allow the hopper and its driving wheel to follow more nearly the contour of the land being traversed.

By the novel arrangement herein described it will be seen that one machine may be used for cotton planting or for corn and other small seed together with fertilizer.

Having thus fully described my invention, I claim—

In a planter, the combination of a main hopper, a roller having recesses varying in size adjacent its respective ends, a removable hopper formed in two compartments which is adapted to fit within the main hopper, the lower corner of the said removable hopper being cut away to admit communication with the said recessed roller, and a suitable operating means, substantially as shown and described.

In testimony whereof I affix my signature in presence of two witnesses.

JAMES VALENTINE PLYLER.

Witnesses:
J. H. SULLIVANT,
DAVID RUFUS HARWELL.